(12) United States Patent
Sjoholm et al.

(10) Patent No.: US 11,396,218 B2
(45) Date of Patent: Jul. 26, 2022

(54) METHODS AND SYSTEMS FOR SUPPLEMENTAL FLOW CONTROL OF WORKING FLUID THROUGH A CLIMATE CONTROL CIRCUIT

(71) Applicant: THERMO KING CORPORATION, Minneapolis, MN (US)

(72) Inventors: Lars I. Sjoholm, Burnsville, MN (US); Young Chan Ma, Bloomington, MN (US); Casey Briscoe, Hopkins, MN (US); Santiago Martinez Ballester, Barcelona (ES)

(73) Assignee: Thermo King Corporation, Minneapolis, MN (US)

( * ) Notice: Subject to any disclaimer, the term of this patent is extended or adjusted under 35 U.S.C. 154(b) by 177 days.

(21) Appl. No.: 16/728,854

(22) Filed: Dec. 27, 2019

(65) Prior Publication Data

US 2020/0208897 A1    Jul. 2, 2020

(30) Foreign Application Priority Data

Dec. 28, 2018 (EP) .................................. 18383002

(51) Int. Cl.
*B60H 1/32* (2006.01)
*F25B 13/00* (2006.01)
(Continued)

(52) U.S. Cl.
CPC .......... *B60H 1/3232* (2013.01); *F25B 13/00* (2013.01); *F25B 41/20* (2021.01); *F25B 41/24* (2021.01);
(Continued)

(58) Field of Classification Search
CPC ....... F25B 13/00; F25B 49/022; F25D 11/003
See application file for complete search history.

(56) References Cited

U.S. PATENT DOCUMENTS

| 5,600,961 A * | 2/1997 | Whipple, III | ......... F04B 25/005 417/287 |
| 2005/0081537 A1* | 4/2005 | Hwang, II | .............. F25B 13/00 62/84 |

(Continued)

FOREIGN PATENT DOCUMENTS

| JP | 3132922 | 11/2000 |
| JP | 2011-064458 | * 3/2011 |

(Continued)

OTHER PUBLICATIONS

Extended European Search Report, issued in the corresponding European patent application No. 18383002.5, dated Jul. 16, 2019, 8 pages.
European Search Report, issued in the corresponding European patent application No. 18383002.5, dated Dec. 22, 2021, 5 pages.

*Primary Examiner* — Henry T Crenshaw
(74) *Attorney, Agent, or Firm* — Hamre, Schumann, Mueller & Larson, P.C.

(57) ABSTRACT

A method for providing supplemental flow control of working fluid through a transport climate control circuit during a start-stop cooling operation mode is provided. The method includes closing a main liquid suction solenoid valve disposed between a condenser and an evaporator of the transport climate control circuit when the compressor is OFF. The method also includes monitoring a climate controlled space temperature within a climate controlled space. When the climate controlled space temperature is greater than or equal to a setpoint temperature, the method includes turning a compressor ON, and opening the main liquid suction solenoid valve when a suction pressure at the suction port of the compressor is less than or equal to a predetermined suction pressure threshold. When the climate controlled space temperature is less than or equal to the setpoint temperature, the
(Continued)

method includes turning the compressor OFF, and closing the main liquid suction solenoid valve.

20 Claims, 8 Drawing Sheets

(51) Int. Cl.
  *F25B 49/02* (2006.01)
  *F25D 11/00* (2006.01)
  *F25B 41/20* (2021.01)
  *F25B 41/24* (2021.01)
(52) U.S. Cl.
  CPC .......... *F25B 49/022* (2013.01); *F25D 11/003* (2013.01)

(56) References Cited

U.S. PATENT DOCUMENTS

| | | | |
|---|---|---|---|
| 2007/0033955 A1* | 2/2007 | Luo | F25B 47/025 |
| | | | 62/150 |
| 2012/0318008 A1 | 12/2012 | Liu et al. | |
| 2019/0346189 A1* | 11/2019 | Saito | F25B 30/02 |
| 2020/0116407 A1* | 4/2020 | Senf, Jr. | F25B 49/025 |
| 2020/0363110 A1* | 11/2020 | Suzuki | F24F 3/065 |

FOREIGN PATENT DOCUMENTS

| | | |
|---|---|---|
| WO | 2011/049767 | 4/2011 |
| WO | 2018/226986 | 12/2018 |

\* cited by examiner

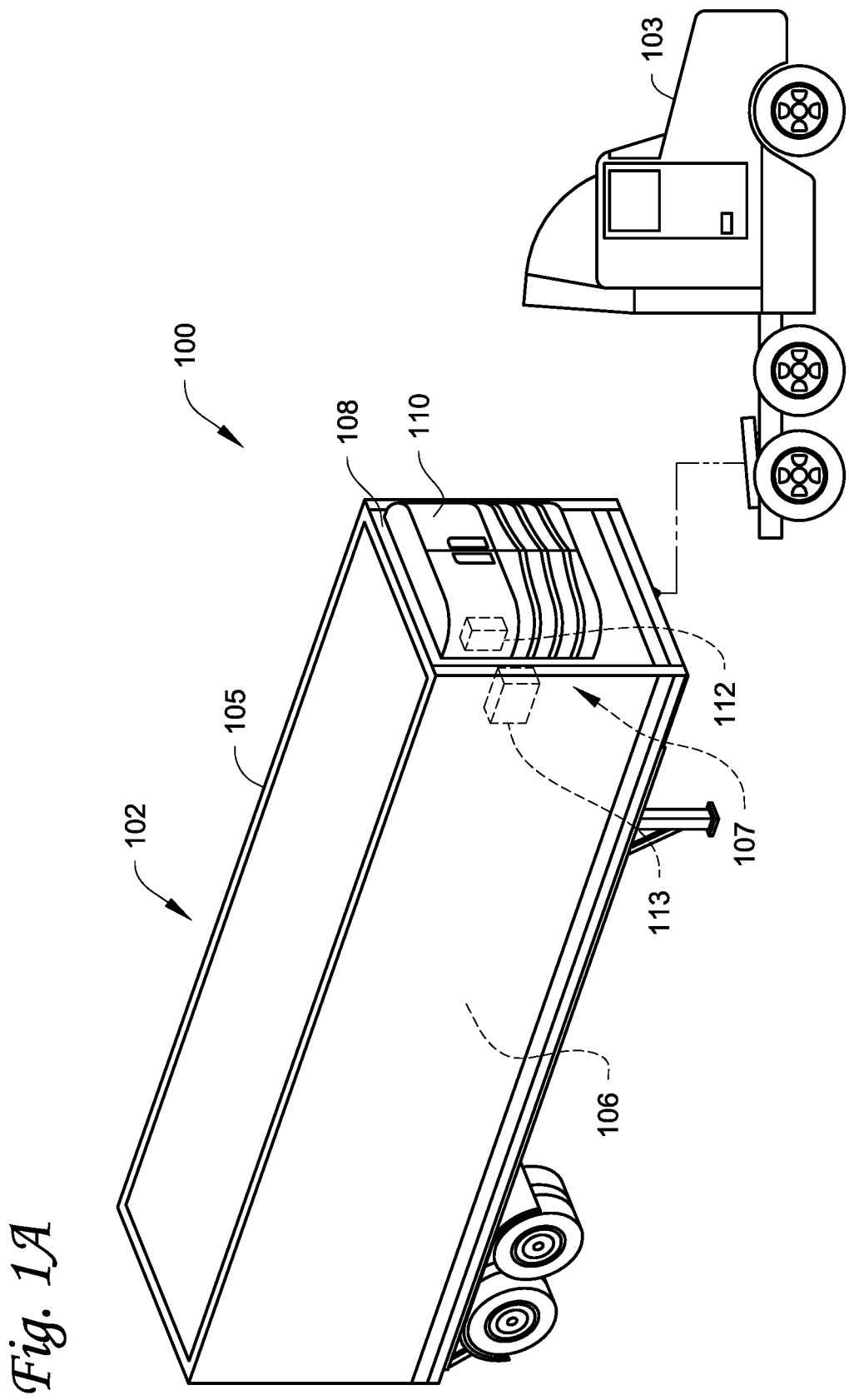

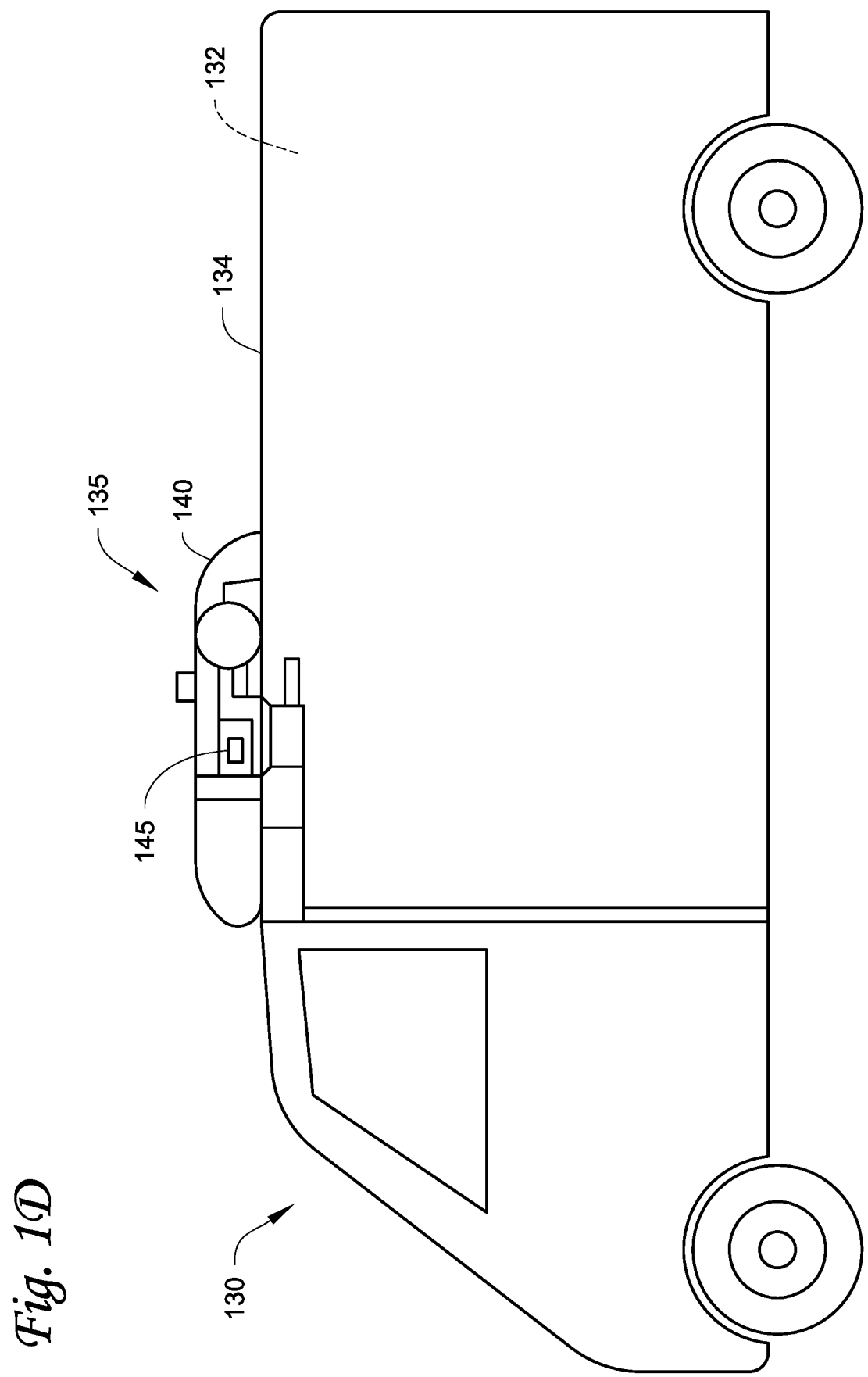

METHODS AND SYSTEMS FOR SUPPLEMENTAL FLOW CONTROL OF WORKING FLUID THROUGH A CLIMATE CONTROL CIRCUIT

FIELD

Embodiments of this disclosure relate generally to a climate control system for a transport unit. More specifically, the embodiments relate to methods and systems for supplemental flow control of working fluid through a transport climate control circuit.

BACKGROUND

A climate control system, a transport climate control system (TCCS) for a transport unit (e.g., a truck, a container (such as a container on a flat car, an intermodal container, marine container, etc.), a box car, a semi-tractor, a bus, or other similar transport unit), etc. may be included on the transport unit to condition air of a climate controlled space (e.g., internal space, cargo space, etc.) of the transport unit. In some transport units, the climate control system can be installed externally (e.g., on a rooftop of the transport unit, on a front wall of the transport unit, etc.). The climate control system can provide a desired environment for cargo stored in the transport unit.

SUMMARY

This disclosure relates generally to a climate control system for a transport unit. More specifically, the embodiments relate to methods and systems for supplemental flow control of working fluid through a transport climate control circuit.

In particular, the embodiments described herein stage operation of various valves in the transport climate control circuit relative to the starting and stopping of a compressor of the transport climate control circuit to provide increased flow control of working fluid within the transport climate control circuit. Accordingly, the embodiments described herein can provide tighter temperature control within a climate controlled space of the transport unit. That is, the embodiments described herein can reduce temperature swing fluctuations within the climate controlled space of the transport unit.

The embodiments described herein can provide supplemental flow control for a transport climate control circuit that includes a compressor with an auxiliary or intermediate suction port (also referred to as an economizer port, a vapor injection port, etc.) in combination with a main suction port and a discharge port.

The embodiments described herein can be used with a fixed speed (e.g., two-speed compressor) or a variable speed compressor. The embodiments described herein can reduce the flow of working fluid through the transport climate control circuit beyond what can be accomplished with a variable speed compressor.

The embodiments described herein can increase the amount of time the compressor is ON and/or the amount of time the compressor is OFF during a start-stop cooling cycle relative to a conventional start-stop cooling operation mode. Accordingly, the number of cycles that the compressor is turned ON and OFF during a set period of time can be reduced and the amount of time for a single cycle in which the compressor is turned ON and then OFF can be increased.

An advantage of the embodiments described herein is that increased capacity control of a compressor of the transport climate control circuit can be provided in order to improve temperature control in a climate controlled space of the transport unit. The embodiments described herein can also minimize relative power consumption of the compressor and thereby the power consumption of the climate control system. Also, the embodiments, described herein can improve startup conditions of the transport climate control circuit and thereby avoid, for example, hydraulic locking of the compressor due to too much liquid working fluid and/or wet working fluid foam entering the compressor. Further, the embodiments described herein can reduce a discharge pressure at the discharge port of the compressor.

In one embodiment, a method for providing supplemental flow control of working fluid through a transport climate control circuit during a start-stop cooling operation mode is provided. The climate control circuit is part of a climate control system that provides climate control within a climate controlled space of a transport unit. The transport climate control circuit includes a condenser, an expansion device, an evaporator, and a compressor with a main suction port, an auxiliary port and a discharge port. The method includes closing a main liquid suction solenoid valve disposed between a condenser and an evaporator of the transport climate control circuit when the compressor is OFF. The method also includes monitoring a climate controlled space temperature within the climate controlled space. When the monitored climate controlled space temperature is greater than or equal to a predetermined setpoint temperature, the method includes turning the compressor ON, and opening the main liquid suction solenoid valve when a suction pressure at a suction port of the compressor is less than or equal to a predetermined suction pressure threshold. When the monitored climate controlled space temperature is less than or equal to the predetermined setpoint temperature, the method includes turning the compressor OFF, and closing the main liquid suction solenoid valve.

In another embodiment, a climate control system for providing climate control within a climate controlled space of a transport unit is provided. The climate control system includes a controller and a transport climate control circuit. The transport climate control circuit includes a condenser, an expansion device, an evaporator, and a compressor that includes a main suction port, an auxiliary port, and a discharge port. The controller is configured to: close a main liquid suction solenoid valve disposed between the condenser and the evaporator of the transport climate control circuit when the compressor is OFF, and monitor a climate controlled space temperature within the climate controlled space. When the monitored climate controlled space temperature is greater than or equal to a predetermined setpoint temperature, the controller is configured to turn the compressor ON, and open the main liquid suction solenoid valve when a suction pressure at the suction port of the compressor is less than or equal to a predetermined suction pressure threshold. When the monitored climate controlled space temperature is less than or equal to the predetermined setpoint temperature, the controller is configured to turn the compressor OFF, and close the main liquid suction solenoid valve.

BRIEF DESCRIPTION OF THE DRAWINGS

References are made to the accompanying drawings that form a part of this disclosure and which illustrate embodi- FIG. 1A illustrates a perspective view of a climate controlled transport unit attached to a tractor, according to one embodiment.

FIG. 1D illustrates a side view of a van with a roof mounted vehicle powered transport refrigeration unit, according to one embodiment.

DETAILED DESCRIPTION

Figure 1B:
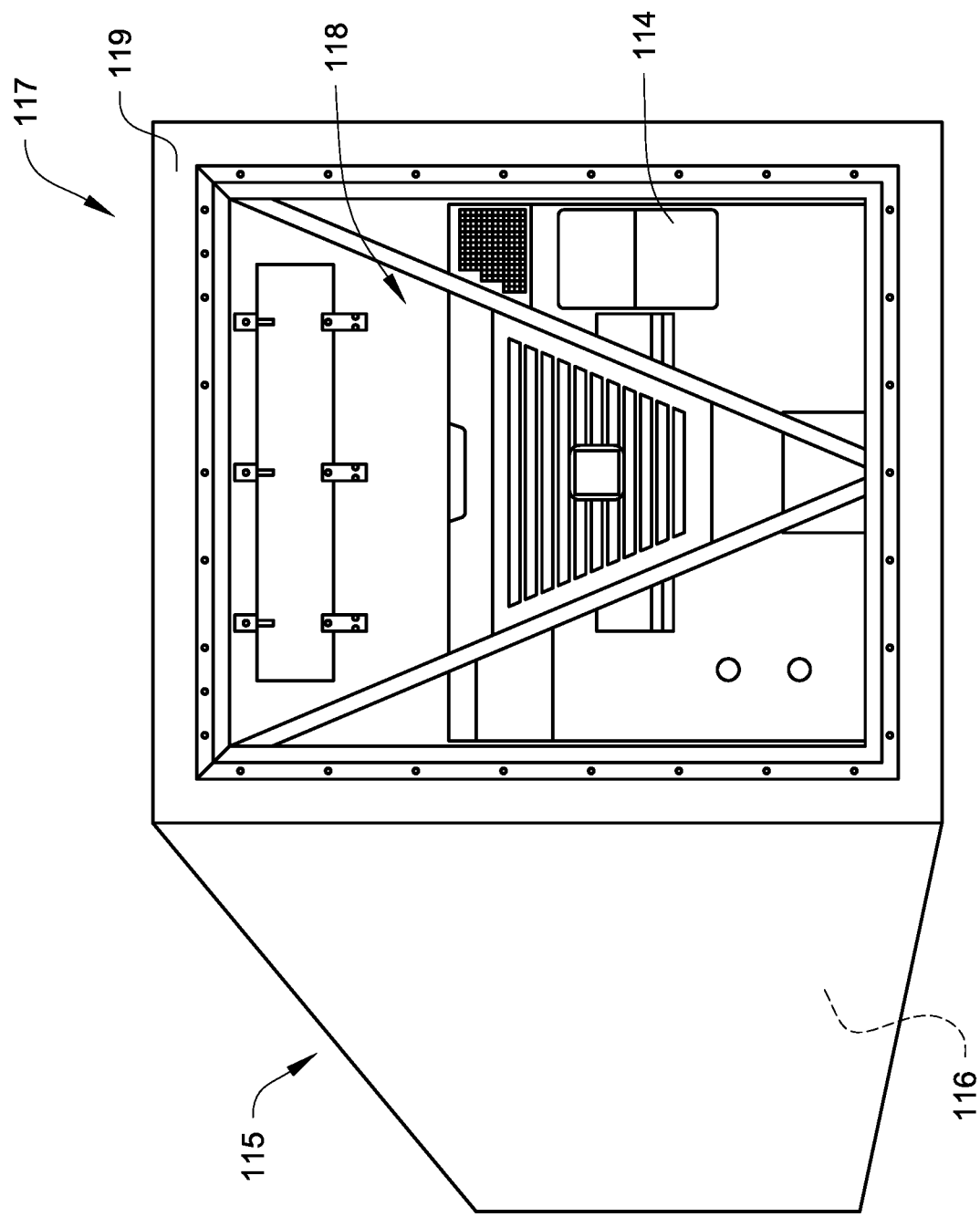
FIG. 1B illustrates a perspective view of a container that includes a climate control system, according to one embodiment.

This disclosure relates generally to a climate control system for a transport unit. More specifically, the embodiments relate to methods and systems for supplemental flow control of working fluid through a transport climate control circuit.

In particular, the embodiments described herein stage operation of various valves in the transport climate control circuit relative to the starting and stopping of a compressor of the transport climate control circuit to provide increased flow control of working fluid within the transport climate control circuit.

An advantage of the embodiments described herein is that increased capacity control of a compressor of the transport climate control circuit can be provided in order to improve temperature control in a climate controlled space of the transport unit. The embodiments described herein can also minimize relative power consumption of the compressor and thereby the power consumption of the climate control system. Also, the embodiments, described herein can improve startup conditions of the transport climate control circuit and thereby avoid, for example, hydraulic locking of the compressor due to too much liquid working fluid and/or wet working fluid foam entering the compressor. Further, the embodiments described herein can reduce a discharge pressure at the discharge port of the compressor. Moreover, the embodiments described herein can minimize the amount of time the compressor is OFF in a start-stop cooling mode and increase the amount of time the compressor is ON in the start-stop cooling mode.

The embodiments described herein can provide supplemental flow control for a transport climate control circuit that includes a compressor with an auxiliary or intermediate suction port (also referred to as an economizer port, a vapor injection port, etc.) in combination with a main suction port and a discharge port.

A climate control system may be generally configured to control one or more environmental conditions (e.g., temperature, humidity, atmosphere, air quality, etc.) in a climate controlled space (e.g., internal space, cargo space, etc.) of a transport unit (e.g., a truck, a container (such as a container on a flat car, an intermodal container, a marine container, etc.), a box car, a semi-tractor, etc.). Generally, the internal space of a transport vehicle can be supplied with fresh air (e.g., outside air) and/or conditioned air (e.g., air conditioned by a transport climate control circuit of the climate control system) by the climate control system.

FIG. 1A illustrates one embodiment of a climate controlled transport unit 102 attached to a tractor 103. The climate controlled transport unit 102 includes a climate control system 100 for a transport unit 105. The tractor 103 is attached to and is configured to tow the transport unit 105. The transport unit 105 shown in FIG. 1A is a trailer. It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The climate control system 100 includes a climate control unit (CCU) 110 that provides environmental control (e.g. temperature, humidity, air quality, etc.) within a climate controlled space 106 of the transport unit 105. The climate control system 100 also includes a programmable climate controller 107 and one or more sensors (not shown) that are configured to measure one or more parameters of the climate control system 100 (e.g., an ambient temperature outside of the transport unit 105, a space temperature within the climate controlled space 106, an ambient humidity outside of the transport unit 105, a space humidity within the climate controlled space 106, etc.) and communicate parameter data to the climate controller 107.

The CCU 110 is disposed on a front wall 108 of the transport unit 105. In other embodiments, it will be appreciated that the CCU 110 can be disposed, for example, on a rooftop or another wall of the transport unit 105. The CCU 110 includes a transport climate control circuit (see FIG. 2) that connects, for example, a compressor, a condenser, an evaporator and an expansion valve to provide conditioned air within the climate controlled space 106.

The climate controller 107 may comprise a single integrated control unit 112 or may comprise a distributed network of climate controller elements 112, 113. The number of distributed control elements in a given network can depend upon the particular application of the principles described herein. The climate controller 107 is configured to control operation of the climate control system 100 including the transport climate control circuit.

FIG. 1B illustrates a container 115 that includes a climate controlled space 116 that is conditioned by a climate control system 117. The climate control system 117 includes a CCU 118 provided on a front wall 119 of the container 115. The CCU 118 provides environmental control (e.g. temperature, humidity, air quality, etc.) within the climate controlled space 116. In some embodiments, the CCU 118 can control a supply air temperature of supply air that is brought into the climate controlled space 116. The CCU 118 includes a transport climate control circuit (see FIG. 2) that connects, for example, a compressor, a condenser, an evaporator and an expansion valve to provide conditioned air within the climate controlled space 116.

The climate control system 100 also includes a programmable climate controller 114 and one or more sensors (not shown) that are configured to measure one or more parameters of the climate control system 100 (e.g., an ambient temperature outside of the container 115, a space temperature within the climate controlled space 116, an ambient humidity outside of the container 115, a space humidity within the climate controlled space 116, etc.) and communicate parameter data to the climate controller 114. The climate controller 114 is configured to control operation of the climate control system 100 including the transport climate control circuit.

Figure 1C:
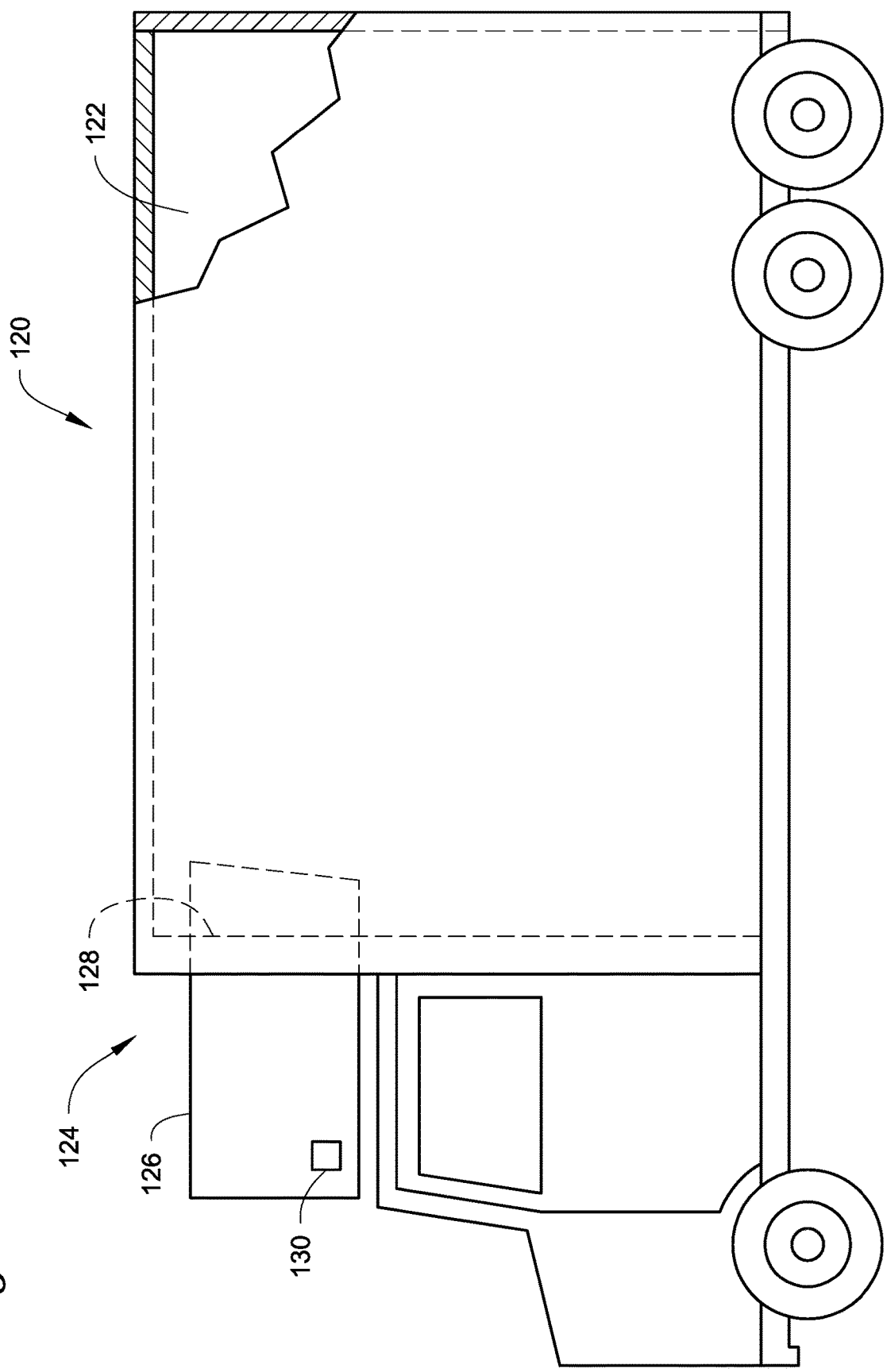
FIG. 1C illustrates a side view of a truck with a front wall mounted vehicle powered transport refrigeration unit, according to one embodiment.

FIG. 1C depicts a temperature-controlled straight truck 120 that includes a climate controlled space 122 for carrying cargo and a climate control system 124. The climate control system 124 includes a CCU 126 that is mounted to a front wall 128 of the load space 112. The CCU 126 is controlled via a climate controller 130 to provide climate control within the climate controlled space 122. The CCU 126 can include, amongst other components, a transport climate control circuit (see FIG. 2) that connects, for example, a compressor, a condenser, an evaporator and an expansion valve to provide climate control within the climate controlled space 122.

The climate control system 124 also includes a programmable climate controller 130 and one or more sensors (not shown) that are configured to measure one or more parameters of the climate control system 124 (e.g., an ambient temperature outside of the truck 120, a space temperature within the climate controlled space 122, an ambient humidity outside of the truck 120, a space humidity within the climate controlled space 122, etc.) and communicate parameter data to the climate controller 130. The climate controller 130 is configured to control operation of the climate control system 124 including the transport climate control circuit.

FIG. 1D depicts a temperature-controlled van 130 that includes a climate controlled space 132 for carrying cargo and a climate control system 135 for providing climate control within the climate controlled space 132. The climate control system 135 includes a CCU 140 that is mounted to a rooftop 134 of the climate controlled space 132. The climate control system 135 can include, amongst other components, a transport climate control circuit (see FIG. 2) that connects, for example, a compressor, a condenser, an evaporator and an expansion valve to provide climate control within the climate controlled space 132.

The climate control system 135 also includes a programmable climate controller 145 and one or more sensors (not shown) that are configured to measure one or more parameters of the climate control system 135 (e.g., an ambient temperature outside of the van 130, a space temperature within the climate controlled space 132, an ambient humidity outside of the van 130, a space humidity within the climate controlled space 132, etc.) and communicate parameter data to the climate controller 130. The climate controller 145 is configured to control operation of the climate control system 124 including the transport climate control circuit.

Figure 2:
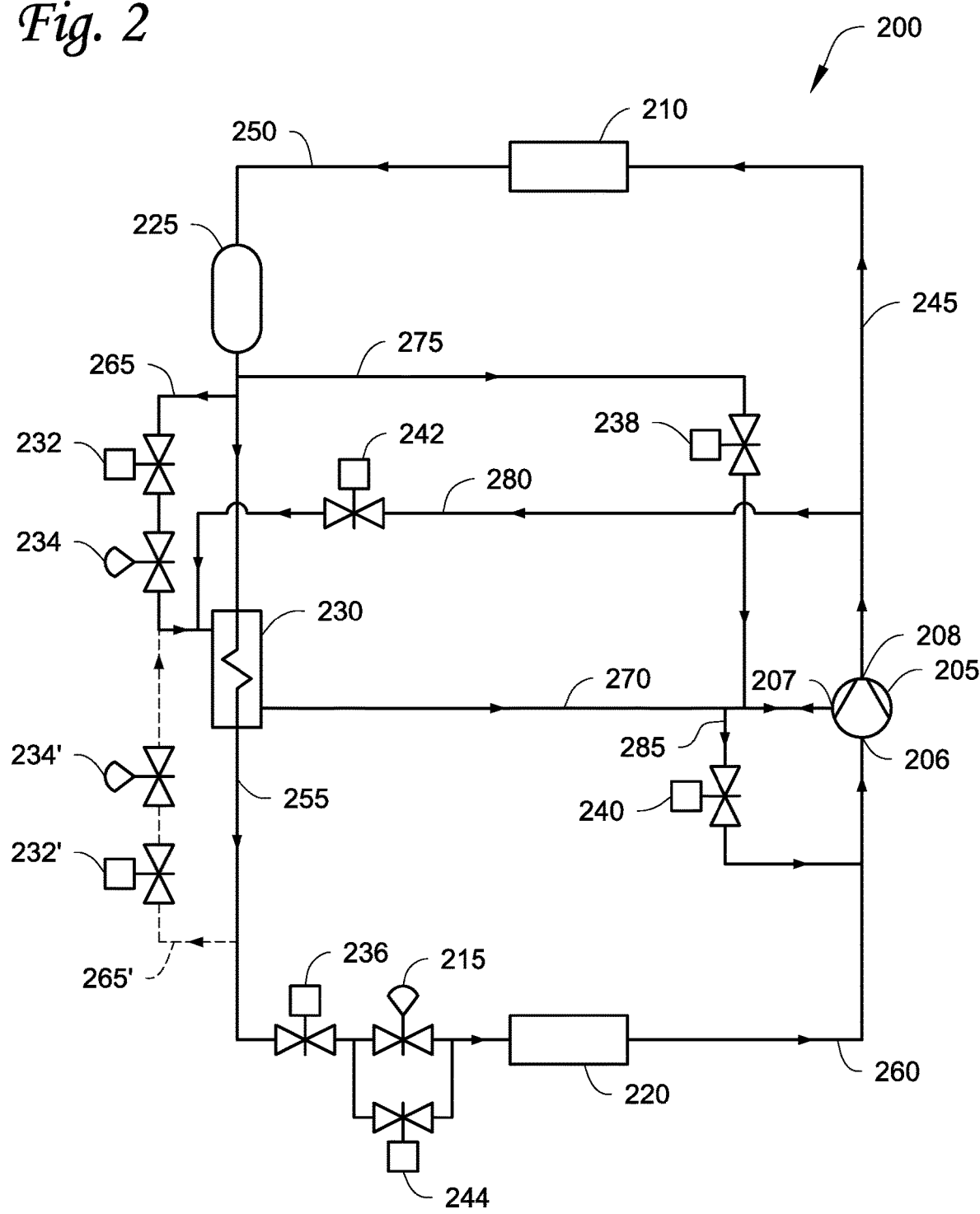
FIG. 2 illustrates a schematic view of a transport climate control circuit, according to one embodiment.

FIG. 2 illustrates a schematic of a transport climate control circuit 200 for a climate control system, according to one embodiment. The transport climate control circuit 200 can be used, for example, with the climate control units 110, 118, 126 and 140 shown in FIGS. 1A-1D. The transport climate control circuit 200 can be controlled by a controller (e.g., the climate controllers 107, 114, 130, 145 shown in FIGS. 1A-1D). The transport climate control circuit 200 includes a compressor 205, a condenser 210, a main thermal expansion device 215, and an evaporator 220. The transport climate control circuit 200 also includes a receiver 225, an economizer heat exchanger 230, a plurality of valves 232, 236, 238, 240, 242, 244, and an economizer expansion device 234. As will be discussed in more detail below, in some embodiments the valve 232 and the expansion device 234 can be replaced with optional valve 232' and optional expansion device 234'.

The compressor 205 is configured to direct a working fluid (e.g., refrigerant) within the circuit 200. The compressor 200 includes a main suction port 206, an auxiliary suction port 207 and a discharge port 208. It will be appreciated that the auxiliary port 207 can also be referred to as an economizer port, a vapor injection port, an intermediate suction port, etc.

In the embodiments described herein, the compressor 205 is configured to not operate or is incapable of operating as a digital compressor that can modulate (e.g., load and unload) the amount of working fluid being compressed at any given time. Accordingly, when the circuit 200 is instructed to operate at less than a full capacity, the compressor 205 operates in a start-stop cooling operation mode in which the compressor 205 cycles between being ON and OFF to control the amount of working fluid being compressed and directed through the circuit 200. In some embodiments, the start-stop cooling operation mode can cause the compressor 205 to rapidly cycle between being ON and OFF.

The compressor 205 can be, for example, a screw compressor, a scroll compressor, a centrifugal compressor, etc. In some embodiments, the compressor 205 can be a two stage compressor in which the auxiliary suction port 207 is connected to the middle of the two stage compressor.

In some embodiments, the compressor 205 can be a fixed speed (e.g., two-speed) compressor. In other embodiments, the compressor 205 can be a variable speed compressor.

In operation, working fluid compressed by the compressor 205 is directed from the discharge port 208 to the condenser 210 via discharge line 245. Working fluid passing through the condenser 210 is directed to the receiver 225 via a liquid line 250. A first portion of the working fluid passing through the receiver 225 is directed through the economizer heat exchanger 230 to a main liquid solenoid valve 236 via a sub-cooled liquid line 255. The working fluid then passes through the main liquid solenoid valve 236 and the main expansion device 215 to the evaporator 220. The working fluid passing through the evaporator 220 is then directed to the main suction port 206 via a main suction line 260. The circuit 200 also includes an expansion device bypass valve 244 that allows working fluid directed from the main liquid solenoid valve 236 to bypass the expansion device 215 and go to the evaporator 220. In some embodiments, the expansion device bypass valve 244 can be sized to roughly match the mass flow of working fluid through the expansion device 244 when the compressor 205 is ON.

A second portion of the working fluid passing through the receiver 225 is directed via an economizer liquid line 265 through an economizer liquid solenoid valve 232 and an economizer expansion device 234 to the economizer heat exchanger 230 to provide heat exchange with the first portion of the working fluid. The second portion of the working fluid is then directed through an economizer suction line 270 to the auxiliary suction port 207. The second portion of the working fluid can also be directed through an economizer bypass valve 240 to the main suction port 206 instead of the auxiliary suction port 207.

A third portion of the working fluid passing through the receiver 225 is directed to a liquid injection valve 238 via a liquid injection line 275 and then to the auxiliary suction port 207. In some embodiments, the liquid injection valve 238 can be a pulsing valve.

The circuit 200 also includes a hot gas bypass line 280 that directs working fluid from the discharge port 208 of the compressor 205 to a hot gas bypass valve 242 before being combined with the second portion of the working fluid directed to the economizer heat exchanger 230.

In some embodiments, the main liquid solenoid valve 236 and the main expansion device 215 can be replaced with an electronic expansion valve with, for example, a stepper motor, a fast pulsing valve, etc.

In some embodiments, the circuit 200 can include a downstream economizer configuration in which the economizer liquid solenoid valve 232, the economizer expansion device 234 and the economizer liquid line 265 are replaced with an optional downstream economizer liquid solenoid valve 232', an optional downstream economizer expansion device 234', and an optional downstream economizer liquid line 265'. In operation, a portion of working fluid passing from the receiver 225 through the economizer heat exchanger 230 to the main liquid solenoid valve 236 can be redirected through the optional downstream economizer liquid line 265' to the optional downstream economizer liquid solenoid valve 232' and the optional downstream expansion device 234' to the economizer heat exchanger 230 to provide heat exchange with the working fluid passing through the economizer heat exchanger 230 to the main liquid solenoid valve 236.

In some embodiments, the economizer liquid solenoid valve 232, the economizer expansion device 234 can be replaced with an electronic expansion valve with, for example, a stepper motor, a fast pulsing valve, etc. Similarly, the optional downstream economizer liquid solenoid valve 232' and the optional downstream expansion device 234' can be replaced with an electronic expansion valve with, for example, a stepper motor, a fast pulsing valve, etc. In these embodiments, the electronic expansion valve can be run with liquid working fluid over-feed thereby potentially rendering the liquid injection line 275 and the liquid injection valve 238 unnecessary.

The circuit 200 can also include one or more sensors to monitor, for example, a temperature or pressure at various points within the circuit 200. For example, the circuit 200 can include a pressure sensor that is configured to monitor a suction pressure of working fluid at the main suction port 206 of the compressor 205.

It will also be appreciated that one or more fans (not shown) may be associated with each of the condenser 210 and the evaporator 220. The condenser fan(s) can be configured to provide a heat exchange between the working fluid passing through the condenser 210 and ambient air from outside of the transport unit. The evaporator fan(s) can be configured to provide a heat exchange between the working fluid passing through the evaporator 220 and air within the climate controlled space. Operation of the circuit 200 is discussed below with respect to FIG. 3.

Figure 3:
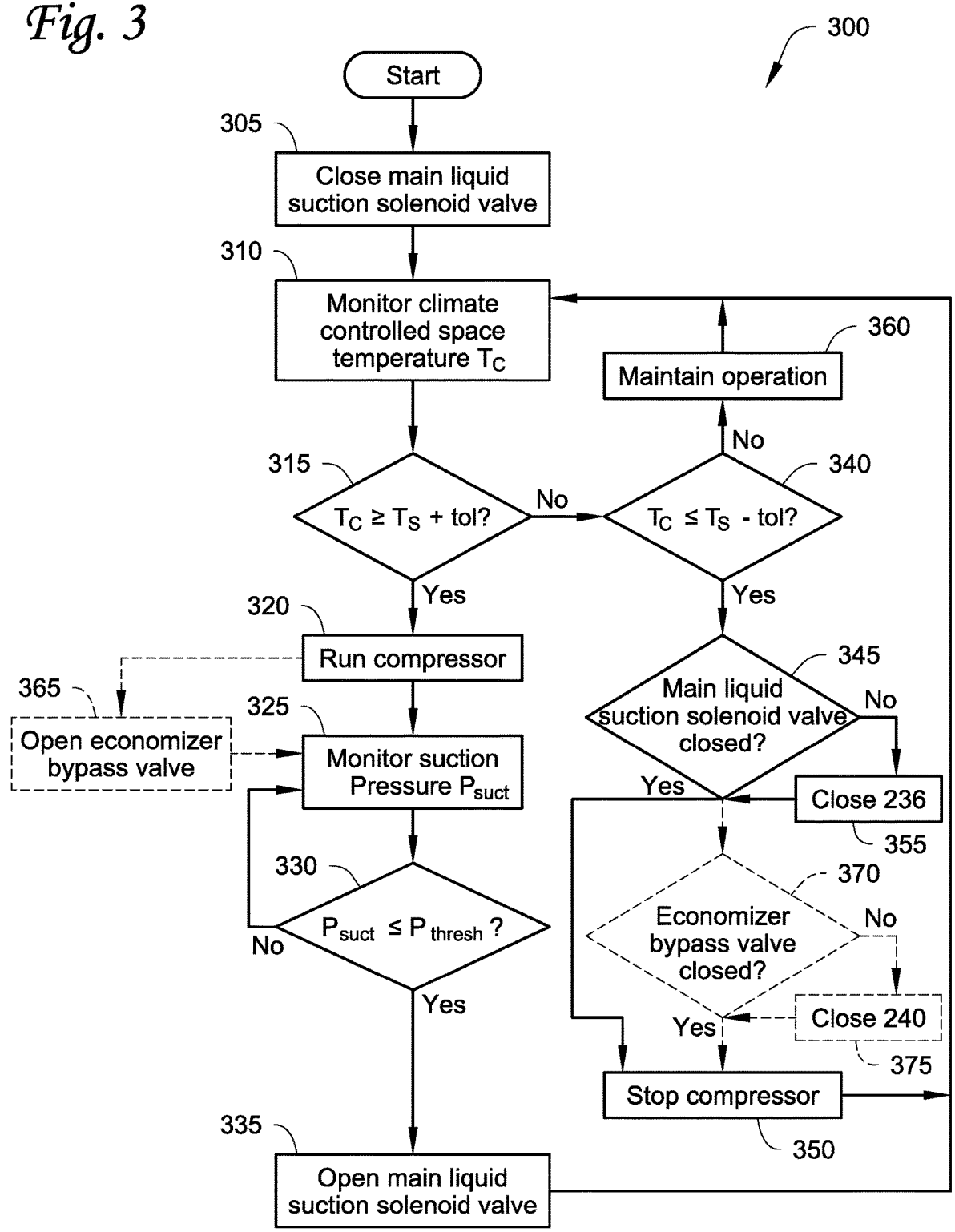
FIG. 3 illustrates a flowchart of a method for providing supplemental flow control of working fluid through a transport climate control circuit during a start-stop cooling operation mode, according to a first embodiment.

FIG. 3 illustrates a flowchart of a method 300 for providing supplemental flow control of working fluid through the transport climate control circuit 200 during a start-stop cooling operation mode, according to a first embodiment.

The method 300 begins at 305 prior to initial startup of the compressor 205 whereby a controller (e.g., the climate controllers 107, 114, 130, 145 shown in FIGS. 1A-1D) closes the main liquid suction solenoid valve 236. The method 300 then proceeds to 310.

At 310, the controller monitors a space temperature $T_C$ within the climate controlled space (e.g., the climate controlled space 106, 116, 122, 132 shown in FIGS. 1A-1D). In some embodiments, the controller receives space temperature data from one or more temperature sensors provided within the climate controlled space. The method 300 then proceeds to 315.

At 315, the controller determines whether the monitored space temperature $T_C$ is greater than or equal to a desired setpoint temperature $T_S$ for the climate controlled space plus a tolerance value tol. The desired setpoint temperature $T_S$ can be a predetermined temperature value that is inputted into the climate control system to maintain the cargo being stored within the climate controlled space. The tolerance value tol can be set to a value that provides stability during constant minor fluctuations in the space temperature $T_C$. In some embodiments, the tolerance value can be, for example, a value between 0.0 to 0.9° C. When the monitored space temperature $T_C$ is greater than or equal to the desired setpoint temperature $T_S$ plus the tolerance value tol, the method 300 proceeds to 320. When the monitored space temperature $T_C$ is not greater than or equal to the desired setpoint temperature $T_S$ plus the tolerance value tol, the method 300 proceeds to 340.

At 320, the controller instructs the compressor 205 to turn ON or remain ON depending on how the compressor 205 is operating. The method 300 then proceeds to 325. Optionally, in some embodiments, where the economizer bypass valve 240 is being used to assist in supplemental flow control, the method 300 can proceed to 365.

At 325, the controller monitors a suction pressure $P_{SUCT}$ at the main suction port 206 of the compressor 205. In some embodiments, the controller receives suction pressure data from a pressure sensor configured to monitor pressure data at the main suction port 206. The method 300 then proceeds to 330.

At 330, the controller determines whether the monitored suction pressure $P_{SUCT}$ is less than or equal to a pressure threshold $P_{Thresh}$. The pressure threshold $P_{Thresh}$ is set to a value that determines whether the circuit 200 is close to a vacuum condition at the main suction port 206 of the compressor 205. In some embodiments, the pressure threshold $P_{Thresh}$ can be set to a value of 0 psig. When the monitored suction pressure $P_{SUCT}$ is less than or equal to a pressure threshold $P_{Thresh}$, the method 300 proceeds to 335. When the monitored suction pressure $P_{SUCT}$ is not less than or equal to a pressure threshold $P_{Thresh}$, the method 300 proceeds back to 325.

At 335, the controller opens the main liquid suction solenoid valve 236 to allow working fluid exiting the receiver 225 to be directed to the main expansion device 215. The method 300 then proceeds back to 310.

At 340, the controller determines whether the monitored space temperature $T_C$ is less than or equal to the desired setpoint temperature $T_S$ for the climate controlled space minus the tolerance value tol. In some embodiments, the tolerance value tol can be different from the tolerance value tol used at 315. When the monitored space temperature $T_C$ is less than or equal to the desired setpoint temperature $T_S$ minus the tolerance value tol, the method 300 proceeds to 345. When the monitored space temperature $T_C$ is not less than or equal to the desired setpoint temperature $T_S$ minus the tolerance value tol, the method 300 proceeds to 360.

At 345, the controller determines whether the main liquid suction solenoid valve 236 is closed. When the controller determines that the main liquid suction solenoid valve 236 is closed, the method 300 proceeds to 350. When the controller determines that the main liquid suction solenoid valve 236 is open, the method 300 proceeds to 355. Optionally, in some embodiments, where the economizer bypass valve 240 is being used to assist in supplemental flow control, the method 300 can proceed to 370.

At 350, the controller ensures that the compressor is OFF or stops operation of (e.g., turns OFF) the compressor 205. The method 300 then proceeds back to 310. At 355, the controller closes the main liquid suction solenoid valve 236 and then proceeds to 350.

At 360, the controller maintains the current operation of the compressor 205. For example, if the compressor 205 is currently operating (e.g., the compressor 205 is ON), the controller maintains operation of the compressor 205. On the other hand, if the compressor 205 is currently not operating (e.g., the compressor 205 is OFF), the controller maintains the compressor from operating. The method 300 then proceeds to 310.

At optional 365, the controller opens the economizer bypass valve 240. In some embodiments, the controller also closes the economizer liquid solenoid valve 232 (or the optional downstream economizer liquid solenoid valve 232'). Accordingly, the gaseous working fluid can escape the auxiliary port 207 and can be directed through the economizer bypass line 285 back to the main suction port 206. In some embodiments, the economizer bypass valve 240 can be opened and closed based on how close the climate controlled space temperature $T_C$ is to the desired setpoint temperature $T_S$. That is, the economizer bypass valve 240 can be closed to increase the capacity of the compressor to bring the climate controlled space temperature $T_C$ closer to the desired setpoint temperature $T_S$. In some embodiments, the controller can pulse the economizer bypass valve 240 instead of simply opening the economizer bypass valve at optional 365. For example, the controller can pulse the economizer bypass valve 240 to approach a step-less climate control. In some embodiments, the amount of time that the economizer bypass valve 240 is closed during a pulse cycle can be proportional to the difference between the climate controlled space temperature $T_C$ and the desired setpoint temperature $T_S$. The method 300 then proceeds to 325.

At optional 370, the controller determines whether the economizer bypass valve 240 is closed. When the controller determines that the economizer bypass valve 240 is closed, the method 300 can proceed to 350. When the controller determines that the economizer bypass valve 240 is open, the method 300 can proceed to optional 375. At 375, the controller closes the economizer bypass valve 240 and then can proceed to 350.

The method 300 allows for a delayed startup of the circuit 200 by starting the compressor 205 for a period of time before the main liquid suction solenoid valve 236 is opened. This can cause condensation buildup in the receiver 225 and the condenser 210 and cause liquid refrigerant to be emptied from the evaporator 220. The circuit 200 can continue to buildup condensation in the receiver 225 and the condenser 210 and empty liquid refrigerant from the evaporator 220 until the main suction port 206 reaches a near vacuum condition. At that point, the main liquid suction solenoid valve 236 can be opened such that working fluid can be directed through the expansion device 215 and the evaporator 220.

Accordingly, the method 300 can increase the amount of time the compressor 205 is ON and the amount of time that the compressor 205 is OFF during a start-stop cooling cycle relative to a conventional start-stop cooling operation mode. It will be appreciated that a conventional start-stop cooling operation mode merely provides that the compressor 205 be turned ON and OFF based on a monitored space temperature within the climate controlled space with the circuit 200 and either does not include the main liquid suction solenoid valve 236 or keeps the main liquid suction solenoid valve 236 open at all times during start-stop cooling operation. By increasing the amount of time the compressor 205 is ON and the amount of time that the compressor 205 is OFF during a start-stop cooling cycle, the number of cycles that the compressor 205 is turned ON and OFF during a set period of time can be reduced and the amount of time for a single cycle in which the compressor 205 is turned ON and then OFF can be increased.

When the method 300 also includes the optional economizer bypass option via 365, 370 and 375, the amount of time that the compressor 205 is ON can be further increased, thereby further reducing the number of cycles that the compressor is turned ON and OFF during a set period of time and further increasing the amount of time for a single cycle in which the compressor 205 is turned ON and then OFF.

Figure 4:
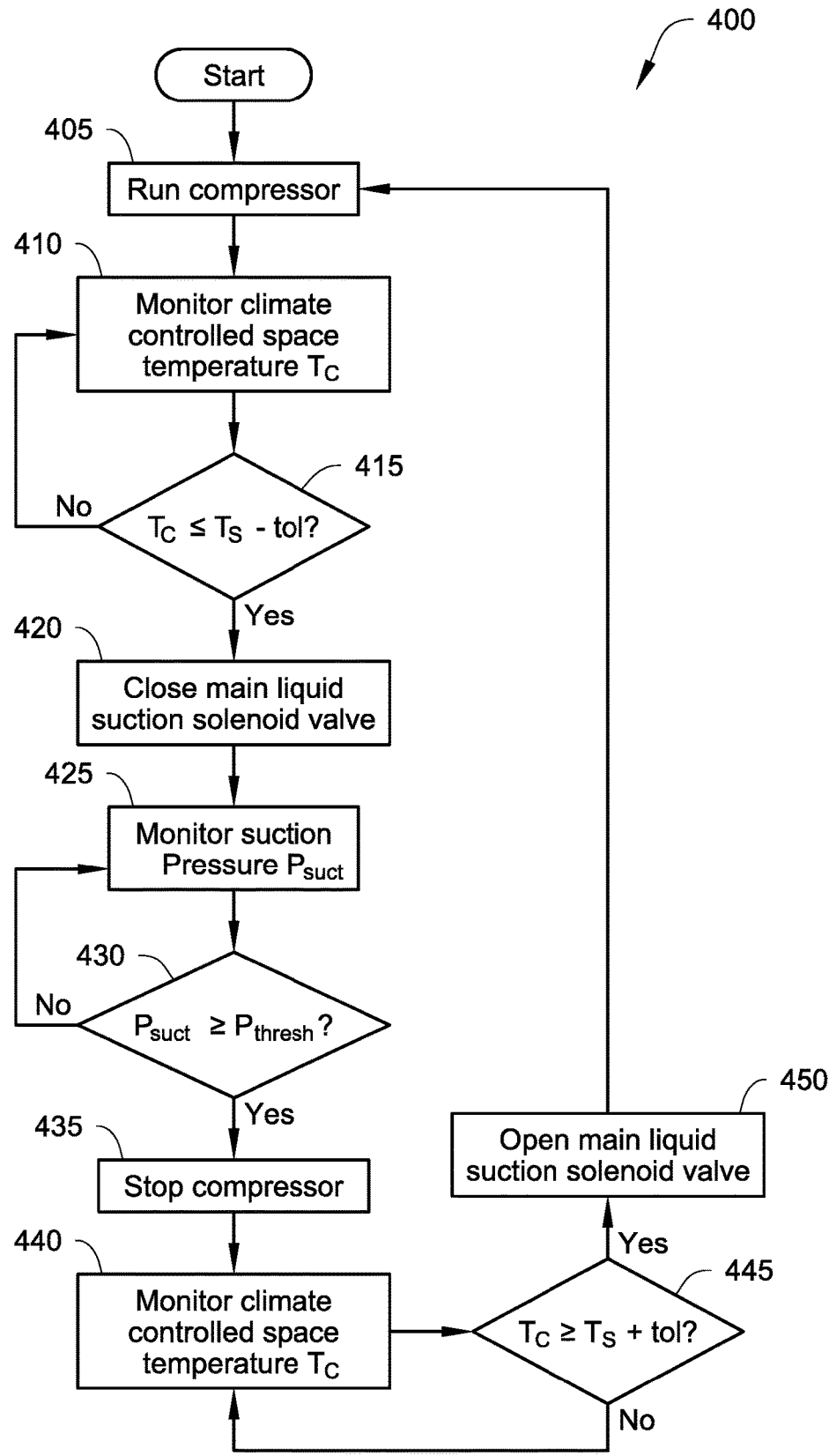
FIG. 4 illustrates a flowchart of a method for providing supplemental flow control of working fluid through a transport climate control circuit during a start-stop cooling operation mode, according to a second embodiment.

FIG. 4 illustrates a flowchart of a method 400 for providing supplemental flow control of working fluid through the transport climate control circuit 200 during a start-stop cooling operation mode, according to a second embodiment.

The method 400 begins at 405 prior to initial startup of the compressor 205 whereby a controller (e.g., the climate controllers 107, 114, 130, 145 shown in FIGS. 1A-1D) instructs the compressor 205 to turn ON. The method 400 then proceeds to 410.

At 410, the controller monitors a space temperature $T_C$ within the climate controlled space (e.g., the climate controlled space 106, 116, 122, 132 shown in FIGS. 1A-1D). In some embodiments, the controller receives space temperature data from one or more temperature sensors provided within the climate controlled space. The method 400 then proceeds to 415.

At 415, the controller determines whether the monitored space temperature $T_C$ is less than or equal to the desired setpoint temperature $T_S$ for the climate controlled space minus the tolerance value tol. The desired setpoint temperature $T_S$ can be a predetermined temperature value that is inputted into the climate control system to maintain the cargo being stored within the climate controlled space. The tolerance value tol can be set to a value that provides stability during constant minor fluctuations in the space temperature $T_C$. In some embodiments, the tolerance value can be, for example, a value between 0.0 to 0.9° C. When the monitored space temperature $T_C$ is less than or equal to the desired setpoint temperature $T_S$ minus the tolerance value tol, the method 400 proceeds to 420. When the monitored space temperature $T_C$ is not less than or equal to the desired setpoint temperature $T_S$ minus the tolerance value tol, the method 400 returns to 410.

At 420, the controller closes the main liquid suction solenoid valve 236. The method 400 then proceeds to 425. At 425, the controller monitors a suction pressure $P_{SUCT}$ at the main suction port 206 of the compressor 205. In some embodiments, the controller receives suction pressure data from a pressure sensor configured to monitor pressure data at the main suction port 206. The method 400 then proceeds to 430.

At 430, the controller determines whether the monitored suction pressure $P_{SUCT}$ is less than or equal to a pressure threshold $P_{Thresh}$. The pressure threshold $P_{Thresh}$ is set to a value that determines whether the circuit 200 is close to a vacuum condition at the main suction port 206 of the compressor 205. In some embodiments, the pressure threshold $P_{Thresh}$ can be set to a value of 0 psig. When the monitored suction pressure $P_{SUCT}$ is less than or equal to a pressure threshold $P_{Thresh}$, the method 400 proceeds to 435. When the monitored suction pressure $P_{SUCT}$ is not less than or equal to a pressure threshold $P_{Thresh}$, the method 400 proceeds back to 425.

At 435, the controller stops operation of (e.g., turns OFF) the compressor 205. The method 400 then proceeds to 440.

At 440, the controller monitors the space temperature $T_C$ within the climate controlled space. In some embodiments, the controller receives space temperature data from one or more temperature sensors provided within the climate controlled space. The method 400 then proceeds to 445.

At 445, the controller determines whether the monitored space temperature $T_C$ is greater than or equal to the desired setpoint temperature $T_S$ for the climate controlled space plus a tolerance value tol. In some embodiments, the tolerance value tol can be different from the tolerance value tol used at 415. When the monitored space temperature $T_C$ is greater than or equal to the desired setpoint temperature $T_S$ plus the tolerance value tol, the method 400 proceeds to 450. When the monitored space temperature $T_C$ is not greater than or equal to the desired setpoint temperature $T_S$ plus the tolerance value tol, the method 400 proceeds back to 440.

At 450, the controller opens the main liquid suction solenoid valve 236 to allow working fluid exiting the receiver 225 to be directed to the main expansion device 215. The method 400 then proceeds back to 405.

The method 400 allows for a delayed shutdown of the circuit 200 by keeping the compressor 205 ON for a period of time with the main liquid suction solenoid valve 236 closed before the compressor 205 is turned OFF. This can cause condensation buildup in the receiver 225 and the condenser 210 and cause liquid refrigerant to be emptied from the evaporator 220. The circuit 200 can continue to buildup condensation in the receiver 225 and the condenser 210 and empty liquid refrigerant from the evaporator 220 until the main suction port 206 reaches a near vacuum condition. At that point, the compressor 205 can be turned OFF.

Accordingly, the method 400 can increase the amount of time the compressor 205 is ON during a start-stop cooling cycle relative to a conventional start-stop cooling operation mode. A conventional start-stop cooling operation mode, as referred to herein, merely provides that the compressor 205 be turned ON and OFF based on a monitored space temperature within the climate controlled space with the circuit 200 either not including the main liquid suction solenoid valve 236 or keeping the main liquid suction solenoid valve 236 open at all times during a start-stop cooling operation.

Figure 5:
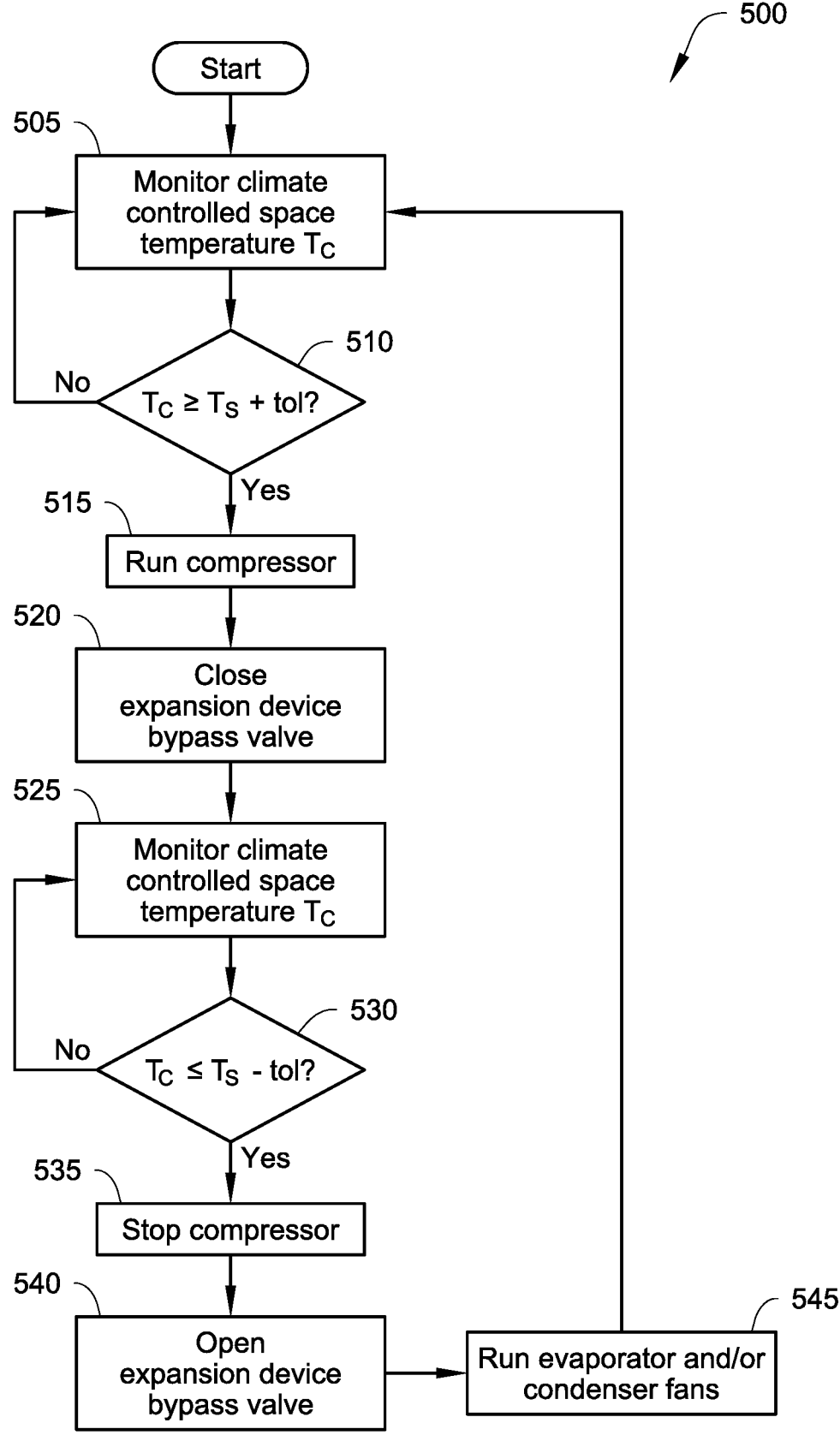
FIG. 5 illustrates a flowchart of a method for providing supplemental flow control of working fluid through a transport climate control circuit during a start-stop cooling operation mode, according to a third embodiment.

FIG. 5 illustrates a flowchart of a method 500 for providing supplemental flow control of working fluid through the transport climate control circuit 200 during a start-stop cooling operation mode, according to a third embodiment.

The method 500 begins at 505 prior to initial startup of the compressor 205 whereby a controller (e.g., the climate controllers 107, 114, 130, 145 shown in FIGS. 1A-1D) monitors a space temperature $T_C$ within the climate controlled space (e.g., the climate controlled space 106, 116, 122, 132 shown in FIGS. 1A-1D). In some embodiments, the controller receives space temperature data from one or more temperature sensors provided within the climate controlled space. The method 500 then proceeds to 510.

At 510, the controller determines whether the monitored space temperature $T_C$ is greater than or equal to a desired setpoint temperature $T_S$ for the climate controlled space plus a tolerance value tol. The desired setpoint temperature $T_S$ can be a predetermined temperature value that is inputted into the climate control system to maintain the cargo being stored within the climate controlled space. The tolerance value tol can be set to a value that provides stability during constant minor fluctuations in the space temperature $T_C$. In some embodiments, the tolerance value can be, for example, a value between 0.0 to 0.9° C. When the monitored space temperature $T_C$ is greater than or equal to the desired setpoint temperature $T_S$ plus the tolerance value tol, the method 500 proceeds to 515. When the monitored space temperature $T_C$ is not greater than or equal to the desired setpoint temperature $T_S$ plus the tolerance value tol, the method 500 proceeds back to 505.

At 515, the controller instructs the compressor 205 to turn ON. The method 500 then proceeds to 520. At 520, the controller closes the expansion device bypass valve 244. This prevents the working fluid from bypassing the expansion device 215 when being directed from the economizer heat exchanger 230 to the evaporator 220. It will be appreciated that in some embodiments the controller can instruct the compressor 205 to turn ON and close the expansion device 215 at the same time.

In some embodiments, instead of the controller closing the expansion device bypass valve 244 at 520, the controller can instruct the valve 244 to pulse open and closed. The method 500 then proceeds to 525.

At 525, the controller monitors the space temperature $T_C$ within the climate controlled space. The method then proceeds to 530. At 530, the controller determines whether the monitored space temperature $T_C$ is less than or equal to the desired setpoint temperature $T_S$ for the climate controlled space minus the tolerance value tol. In some embodiments, the tolerance value tol can be different from the tolerance value tol used at 510. When the monitored space temperature $T_C$ is less than or equal to the desired setpoint temperature $T_S$ minus the tolerance value tol, the method 500 proceeds to 535. When the monitored space temperature $T_C$ is not less than or equal to the desired setpoint temperature $T_S$ minus the tolerance value tol, the method 500 proceeds back to 525.

At 535, the controller stops operation of (e.g., turns OFF) the compressor 205. The method 500 then proceeds to 540. At 540, the controller opens the expansion device bypass valve 244. This allows working fluid to bypass the expansion device 214 when being directed from the economizer heat exchanger 230 to the evaporator 220. The method 500 then proceeds to 545.

At 545, the controller instructs one or more evaporator fan(s) and/or one or more condenser fan(s) to continue operation while the compressor 205 is OFF.

The method 500 allows for working fluid in the form of hot liquid that is not throttled by the bypass the expansion device 215 to enter the evaporator 215. This can supply heat to the evaporator 220. Accordingly, the method 500 can increase the amount of time the compressor 205 is ON and decrease the amount of time the compressor is OFF during a start-stop cooling cycle relative to a conventional start-stop cooling operation mode. A conventional start-stop cooling operation mode merely provides that the compressor 205 be turned ON and OFF based on a monitored space temperature within the climate controlled space with the circuit 200 not including the expansion device bypass valve 244 or keeping the expansion device bypass valve 244 open at all times during start-stop cooling operation.

It will be appreciated that the features of the methods 300, 400, 500 can be combined to provide improved flow control of working fluid during a start-stop cooling operation mode of the transport climate control circuit 200. That is, in some embodiments, delayed startup of the of the circuit 200 as provided in the method 300 can be combined with the delayed shutdown of the circuit 200 as provided in the method 400 and/or with expansion device bypass as provided in the method 500. Also in some embodiments, the delayed shutdown of the circuit 200 as provided in the method 400 can be combined with expansion device bypass as provided in the method 500. Further, in some embodiments, the delayed shutdown of the circuit 200 as provided in the method 400 and/or the expansion device bypass as provided in the method 500 can include an economizer bypass as provided at 365 in the method 300.

Aspects:

It is to be appreciated that any of aspects 1-8 can be combined with any of aspects 9-16.

Aspect 1. A method for providing supplemental flow control of working fluid through a transport climate control circuit during a start-stop cooling operation mode, the climate control circuit being part of a climate control system providing climate control within a climate controlled space of a transport unit, the transport climate control circuit including a condenser, an expansion device, an evaporator, and a compressor with a main suction port, an auxiliary port and a discharge port, the method comprising:
 closing a main liquid suction solenoid valve disposed between a condenser and an evaporator of the transport climate control circuit when the compressor is OFF;
 monitoring a climate controlled space temperature within the climate controlled space;
 when the monitored climate controlled space temperature is greater than or equal to a predetermined setpoint temperature:
  turning the compressor ON, and
  opening the main liquid suction solenoid valve when a suction pressure at the suction port of the compressor is less than or equal to a predetermined suction pressure threshold; and
 when the monitored climate controlled space temperature is less than or equal to the predetermined setpoint temperature:
  turning the compressor OFF, and
  closing the main liquid suction solenoid valve.

Aspect 2. The method of aspect 1, further comprising directing the working fluid from the condenser to the auxiliary port of the compressor via an economizer suction line when the compressor is ON and the main liquid suction solenoid valve is closed.

Aspect 3. The method of any of aspects 1 and 2, further comprising opening an economizer bypass valve and directing the working fluid exiting the auxiliary port of the compressor directly to the main suction port of the compressor when the monitored climate controlled space temperature is greater than or equal to the predetermined setpoint temperature.

Aspect 4. The method of any of aspects 1-3, further comprising pulsing an economizer bypass valve to open and close for directing the working fluid exiting the auxiliary port of the compressor directly to the main suction port of the compressor when the monitored climate controlled space temperature is greater than or equal to the predetermined setpoint temperature.

Aspect 5. The method of any of aspects 1-4, wherein when the monitored climate controlled space temperature is less than or equal to the predetermined setpoint temperature:
 closing the main liquid suction solenoid valve, and then turning the compressor OFF.

Aspect 6. The method of any of aspects 1-5, wherein when the monitored climate controlled space temperature is less than or equal to the predetermined setpoint temperature:
 turning the compressor OFF and then closing the main liquid suction solenoid valve when a suction pressure at a suction port of the compressor is less than or equal to a predetermined suction pressure threshold.

Aspect 7. The method of any of aspects 1-6, wherein when the monitored climate controlled space temperature is greater than or equal to a predetermined setpoint temperature:
 closing an expansion device bypass valve to allow the working fluid from the condenser to pass through the main expansion device; and
 wherein when the monitored climate controlled space temperature is less than or equal to the predetermined setpoint temperature:
  opening the expansion device bypass valve to allow the working fluid from the condenser to bypass the main expansion device and travel directly to the evaporator.

Aspect 8. The method of aspect 7, wherein when the monitored climate controlled space temperature is less than or equal to the predetermined setpoint temperature:
 operating at least one of a condenser fan and an evaporator fan while the compressor is OFF and the expansion device bypass valve is open.

Aspect 9. A climate control system for providing climate control within a climate controlled space of a transport unit comprising:
 a controller; and
 a transport climate control circuit, the transport climate control circuit including a condenser, an expansion device, an evaporator, and a compressor that includes a main suction port, an auxiliary port, and a discharge port,
 wherein the controller is configured to:
  close a main liquid suction solenoid valve disposed between the condenser and the evaporator of the transport climate control circuit when the compressor is OFF,
  monitor a climate controlled space temperature within the climate controlled space,
  when the monitored climate controlled space temperature is greater than or equal to a predetermined setpoint temperature:
   turn the compressor ON, and
   open the main liquid suction solenoid valve when a suction pressure at the suction port of the compressor is less than or equal to a predetermined suction pressure threshold, and
  when the monitored climate controlled space temperature is less than or equal to the predetermined setpoint temperature:
   turn the compressor OFF, and
   close the main liquid suction solenoid valve.

Aspect 10. The climate control system of aspect 9, wherein the controller is configured to direct the working fluid from the condenser to the auxiliary port of the compressor via an economizer suction line when the compressor is ON and the main liquid suction solenoid valve is closed.

Aspect 11. The climate control system of any of aspects 9 and 10, wherein the controller opens an economizer bypass valve to direct the working fluid exiting the auxiliary port of the compressor directly to the main suction port of the compressor when the monitored climate controlled space temperature is greater than or equal to the predetermined setpoint temperature.

Aspect 12. The climate control system of any of aspects 9-11, wherein the controller pulses an economizer bypass valve to open and close to direct the working fluid exiting the auxiliary port of the compressor directly to the main suction port of the compressor when the monitored climate controlled space temperature is greater than or equal to the predetermined setpoint temperature.

Aspect 13. The climate control system of any of aspects 9-12, wherein the controller closes the main liquid suction solenoid valve, and then turns the compressor OFF when the monitored climate controlled space temperature is less than or equal to the predetermined setpoint temperature.

Aspect 14. The climate control system of any of aspects 9-13, wherein when the monitored climate controlled space temperature is less than or equal to the predetermined setpoint temperature:
the controller turns the compressor OFF and then closes the main liquid suction solenoid valve when a suction pressure at a suction port of the compressor is less than or equal to a predetermined suction pressure threshold.

Aspect 15. The climate control system of any of aspects 9-14, wherein when the monitored climate controlled space temperature is greater than or equal to a predetermined setpoint temperature:
the controller closes an expansion device bypass valve to allow the working fluid from the condenser to pass through the main expansion device; and
wherein when the monitored climate controlled space temperature is less than or equal to the predetermined setpoint temperature:
the controller opens the expansion device bypass valve to allow the working fluid from the condenser to bypass the main expansion device and travel directly to the evaporator.

Aspect 16. The climate control system of aspect 15, wherein when the monitored climate controlled space temperature is less than or equal to the predetermined setpoint temperature:
the controller operates at least one of a condenser fan and an evaporator fan while the compressor is OFF and the expansion device bypass valve is open.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for providing supplemental flow control of working fluid through a transport climate control circuit during a start-stop cooling operation mode, the climate control circuit being part of a climate control system providing climate control within a climate controlled space of a transport unit, the transport climate control circuit including a condenser, an expansion device, an evaporator, and a compressor with a main suction port, an auxiliary port and a discharge port, the method comprising:
closing a main liquid suction solenoid valve disposed between a condenser and an evaporator of the transport climate control circuit prior to initial startup of the compressor;
monitoring a climate controlled space temperature within the climate controlled space;
when the monitored climate controlled space temperature is greater than or equal to a predetermined setpoint temperature:
turning the compressor ON, and
opening the main liquid suction solenoid valve when a suction pressure at the suction port of the compressor is less than or equal to a predetermined suction pressure threshold;
when the monitored climate controlled space temperature is less than the predetermined setpoint temperature:
at least one of ensuring the compressor is OFF and turning the compressor OFF, and
at least one of ensuring the main liquid suction solenoid valve is closed and closing the main liquid suction solenoid valve.

2. The method of claim 1, further comprising directing the working fluid from the condenser to the auxiliary port of the compressor via an economizer suction line when the compressor is ON and the main liquid suction solenoid valve is closed.

3. The method of claim 1, further comprising opening an economizer bypass valve and directing the working fluid exiting the auxiliary port of the compressor directly to the main suction port of the compressor when the monitored climate controlled space temperature is greater than or equal to the predetermined setpoint temperature.

4. The method of claim 1, further comprising pulsing an economizer bypass valve to open and close for directing the working fluid exiting the auxiliary port of the compressor directly to the main suction port of the compressor when the monitored climate controlled space temperature is greater than or equal to the predetermined setpoint temperature.

5. The method of claim 1, wherein when the monitored climate controlled space temperature is less than or equal to the predetermined setpoint temperature:
closing the main liquid suction solenoid valve, and then turning the compressor OFF.

6. The method of claim 1, wherein when the monitored climate controlled space temperature is less than or equal to the predetermined setpoint temperature:
turning the compressor OFF and then closing the main liquid suction solenoid valve when a suction pressure at a suction port of the compressor is less than or equal to a predetermined suction pressure threshold.

7. The method of claim 1, wherein when the monitored climate controlled space temperature is greater than or equal to a predetermined setpoint temperature:
closing an expansion device bypass valve to allow the working fluid from the condenser to pass through a main expansion device; and wherein when the monitored climate controlled space temperature is less than or equal to the predetermined setpoint temperature:
opening the expansion device bypass valve to allow the working fluid from the condenser to bypass the main expansion device and travel directly to the evaporator.

8. The method of claim 7, wherein when the monitored climate controlled space temperature is less than or equal to the predetermined setpoint temperature:
operating at least one of a condenser fan and an evaporator fan while the compressor is OFF and the expansion device bypass valve is open.

9. A climate control system for providing climate control within a climate controlled space of a transport unit comprising:
a controller; and
a transport climate control circuit, the transport climate control circuit including a condenser, an expansion device, an evaporator, and a compressor that includes a main suction port, an auxiliary port, and a discharge port,
wherein the controller is configured to:
close a main liquid suction solenoid valve disposed between the condenser and the evaporator of the transport climate control circuit prior to initial startup of the compressor,
monitor a climate controlled space temperature within the climate controlled space,
when the monitored climate controlled space temperature is greater than or equal to a predetermined setpoint temperature:
turn the compressor ON, and
open the main liquid suction solenoid valve when a suction pressure at the suction port of the compressor is less than or equal to a predetermined suction pressure threshold, and
when the monitored climate controlled space temperature is less than the predetermined setpoint temperature:
at least one of ensure the compressor is OFF and turn the compressor OFF, and
at least one of ensure the main liquid suction solenoid valve is OFF and close the main liquid suction solenoid valve.

10. The climate control system of claim 9, wherein the controller is configured to direct the working fluid from the condenser to the auxiliary port of the compressor via an economizer suction line when the compressor is ON and the main liquid suction solenoid valve is closed.

11. The climate control system of claim 9, wherein the controller opens an economizer bypass valve to direct the working fluid exiting the auxiliary port of the compressor directly to the main suction port of the compressor when the monitored climate controlled space temperature is greater than or equal to the predetermined setpoint temperature.

12. The climate control system of claim 9, wherein the controller pulses an economizer bypass valve to open and close to direct the working fluid exiting the auxiliary port of the compressor directly to the main suction port of the compressor when the monitored climate controlled space temperature is greater than or equal to the predetermined setpoint temperature.

13. The climate control system of claim 9, wherein the controller closes the main liquid suction solenoid valve, and then turns the compressor OFF when the monitored climate controlled space temperature is less than or equal to the predetermined setpoint temperature.

14. The climate control system of claim 9, wherein when the monitored climate controlled space temperature is less than or equal to the predetermined setpoint temperature:
the controller turns the compressor OFF and then closes the main liquid suction solenoid valve when a suction pressure at a suction port of the compressor is less than or equal to a predetermined suction pressure threshold.

15. The climate control system of claim 9, wherein when the monitored climate controlled space temperature is greater than or equal to a predetermined setpoint temperature:
the controller closes an expansion device bypass valve to allow the working fluid from the condenser to pass through a main expansion device; and
wherein when the monitored climate controlled space temperature is less than or equal to the predetermined setpoint temperature:
the controller opens the expansion device bypass valve to allow the working fluid from the condenser to bypass the main expansion device and travel directly to the evaporator.

16. The climate control system of claim 15, wherein when the monitored climate controlled space temperature is less than or equal to the predetermined setpoint temperature:
the controller operates at least one of a condenser fan and an evaporator fan while the compressor is OFF and the expansion device bypass valve is open.

17. The method of 1, wherein the expansion device is separate from the main liquid suction solenoid valve.

18. The climate control system of claim 9, wherein the expansion device is separate from the main liquid suction solenoid valve.

19. The method of claim 1, further comprising, upon turning the compressor ON and opening the main liquid suction solenoid valve, continuing to monitor the climate controlled space temperature within the climate controlled space; and
when the monitored climate controlled space temperature is less than or equal to the predetermined setpoint temperature:
turning the compressor OFF, and
closing the main liquid suction solenoid valve.

20. The climate control system of claim 9, wherein the controller is configured to:
upon turning the compressor ON and opening the main liquid suction solenoid valve, continue to monitor the climate controlled space temperature within the climate controlled space; and
when the monitored climate controlled space temperature is less than the predetermined setpoint temperature:
turn the compressor OFF, and
close the main liquid suction solenoid valve.

* * * * *